May 13, 1930.  T. WILFRED  1,758,589
LIGHT PROJECTION DISPLAY
Filed Dec. 21, 1927  2 Sheets-Sheet 1
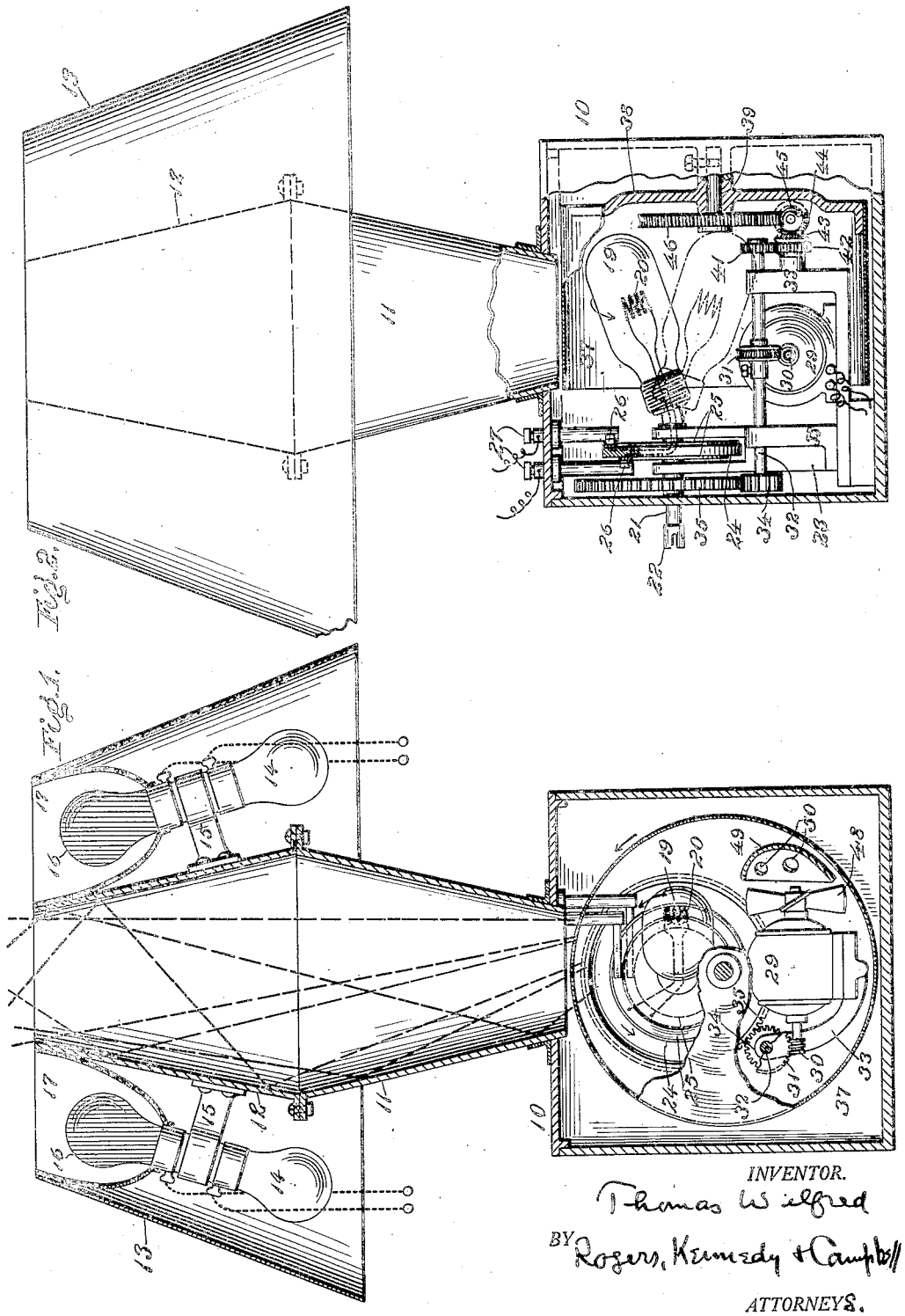
INVENTOR.
Thomas Wilfred
BY Rogers, Kennedy & Campbell
ATTORNEYS.

May 13, 1930. T. WILFRED 1,758,589
LIGHT PROJECTION DISPLAY
Filed Dec. 21, 1927 2 Sheets-Sheet 2
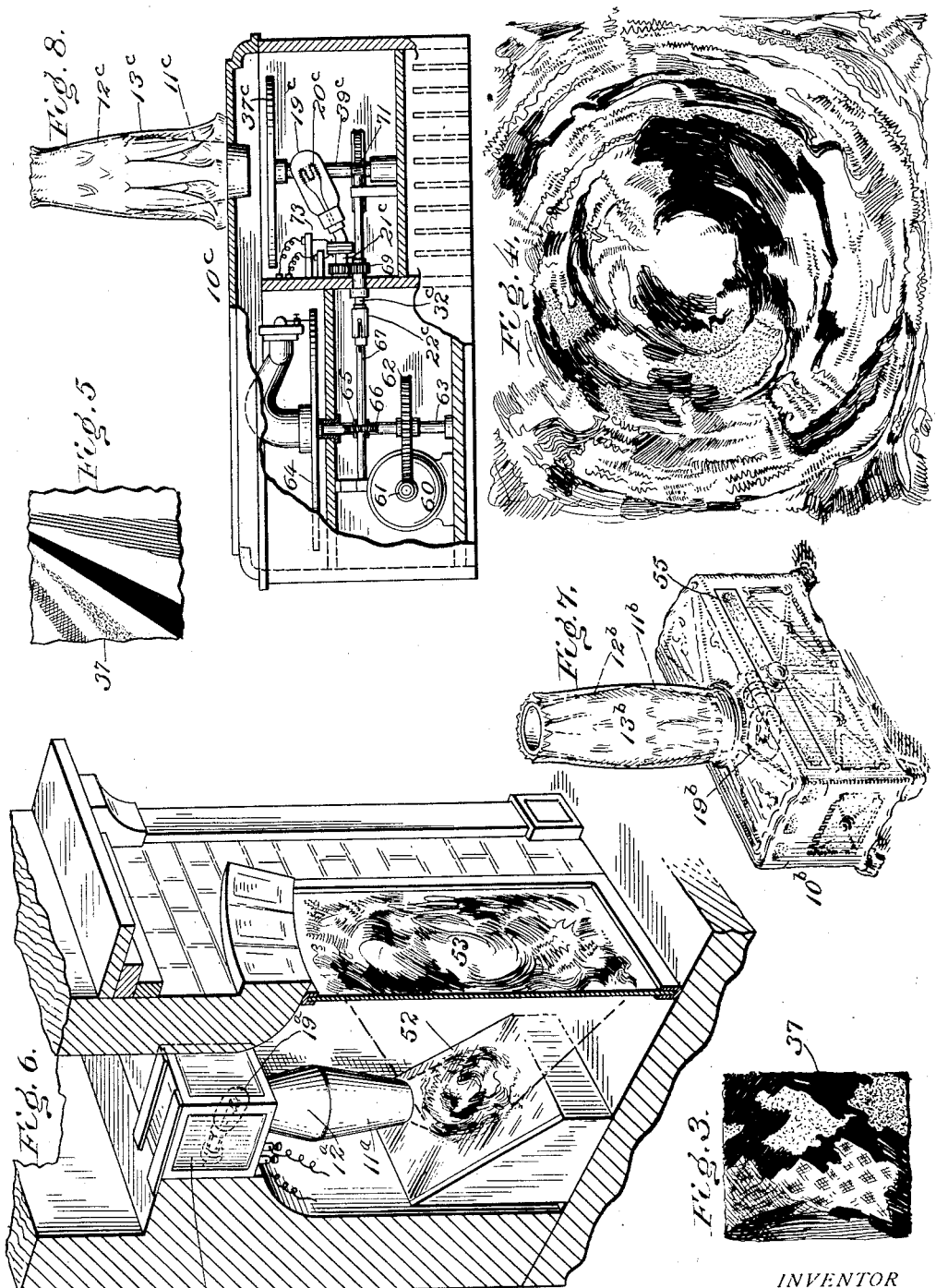
INVENTOR
Thomas Wilfred
BY Rogers, Kennedy & Campbell
ATTORNEYS.

Patented May 13, 1930

1,758,589

UNITED STATES PATENT OFFICE

THOMAS WILFRED, OF FOREST HILLS, NEW YORK

LIGHT-PROJECTION DISPLAY

Application filed December 21, 1927. Serial No. 241,577.

This invention relates to the art of light projection display, for example in the projection of effects in light or color upon a curtain or other surface for exhibition, entertainment, interpretation, eye treatment or other purposes. A novel method or system is involved as well as a novel apparatus or machine for carrying it out.

The general object of the present invention is to afford a system of projection upon a suitable receiving surface of effects in lights and shadows or colors adapted to please the mind or stir the imagination or emotions, the effects including infinite and continuous variations in tone, pattern, motion and evolution of effect. A particular object of the present invention is to afford certain new, interesting and entertaining types of projected effects as will be herein described. Other and further objects and advantages will be pointed out in the following specification or will be apparent to those conversant with the subject.

To the attainment of the objects and advantages referred to the present invention consists in the novel art, system or method, and the novel apparatus or machine, herein described or illustrated, as well as the novel features of operation, interaction, combination, arrangement and structure.

In the accompanying drawings Fig. 1 is a vertical substantially central section view of a projecting apparatus embodying the principles of the present invention.

Fig. 2 is a similar view taken however in section at right angles to Fig. 1 and with the upper part of the figure in elevation.

Fig. 3 is a developed or face view of the patterned or multicolor screen constituting one of the elements shown in Figs. 1 and 2.

Fig. 4 in a rough way shows the character of one of the infinite number of projected effects producible with the apparatus of Figs. 1, 2 and 3.

Fig. 5 is a view similar to Fig. 3 showing one of the many forms of patterned screen which may be employed for the purposes hereof.

Fig. 6 is a perspective elevation, partly in section of a modified form of apparatus in which the projected effect is bent by a mirror from vertical to horizontal and thrown against an upright translucent receiving screen.

Fig. 7 in perspective shows a further modification wherein the apparatus is embodied in an ornamental form.

Fig. 8 partially in elevation and partially in central section shows the combination of an automatic sound or music producing machine with an apparatus embodying the present invention, the two connected to be driven in unison.

First will be described the apparatus shown in Figs. 1 to 3 inclusive, the mode of action and effects to be described subsequently. A box or housing 10 encloses the mechanism and light source. In this embodiment the projected effects are intended to be thrown upwardly to be received, for example upon the ceiling of a living room, auditorium or other place. The optical devices exterior to the box 10 therefore are located at the top side of the box, although obviously the entire structure could be turned and directed in any desired manner. The exterior optical devices are shown as including a novel reflecting system, the principal element of which is a flaring cone 11, connected to the box top, and with its interior surface silvered or polished, and either geometrically true or with any desired variations or irregularities in order to alter or heighten the effects. The reflector therefore may be broadly considered as a hollow flaring interior reflector or mirror. The combination of this with the other elements, later to be described, is capable of certain novel effects, but the full embodiment of the present invention comprises, in combination with the flaring internal reflector 11 a succeeding tapered internal reflector 12, which in this embodiment is shown also of conical form, or rather that of a truncated cone, the extreme or upper end being open for the passage of the light and color effects as will be more fully described.

With the vertical or upright type of apparatus the double cone reflector 11, 12 may be partly concealed and made to simulate a lamp by providing an enclosing shade 13. The effect of a table lamp can be further carried out by providing between the reflector and the shade a number of ordinary electric lamps or bulbs 14, which may be extinguished if desirable during the performance of an optical effect. The lamps 14 are shown supported on brackets 15 which also support upwardly directed lamps or bulbs 16 which may be of some rich color, as red, to throw a background on the ceiling for the reception of the moving effects of this invention. The several colored bulbs 16 are shown enclosed in upwardly directed reflectors 17.

The source of illumination for the present invention consists preferably of a filamentary lamp 19 which may be an ordinary, or a specially designed, incandescent lamp, having a filament 20 which may be given a contour consonant with the effect desired, since the present invention operates by the projection of light from the particular form of incandescent filament used. Moreover the invention preferably involves the continuous or evolutionary movement of the lamp 19, which may, for example, be given a rotary movement and at the same time a movement of revolution, these combined movements being conveniently obtained by mounting the lamp eccentrically upon a shaft 21, so that as the shaft is turned the lamp passes through what may be described as wobbling movements, substantially indicated by the full line and dotted line positions in Fig. 2. It will be noticed that the filament 20, in each of its positions, is substantially within the theoretical continuation of the surface of the flaring reflector 11. In its lowest position the filament reaches almost to the apex of the flaring cone, the revolutionary movement of the filament carrying it both inwardly, from and toward the apex, and laterally from side to side.

The lamp shaft 21 is shown as having an exterior coupling 22 by which it may be coupled to a music box or other musical instrument arranged to perform simultaneously with the present invention. The lamp shaft is shown mounted in a bearing bracket 23 and as provided with a commutator disk 24 having opposite rings 25 connected respectively to the terminals of the filaments 20, while brushes 26 contacting upon the rings are mounted on terminal posts 27 by which electric current can be delivered to the lamp.

The mode of drive may next conveniently be described. An electric motor 29 is shown, its shaft carrying a worm 30 driving a worm wheel 31 mounted on what may be termed the main shaft 32, supported in bearing brackets 33. A pinion 34 on the main shaft drives a gear 35 on the lamp shaft, thus maintaining the lamp in continuous motion.

While interesting effects can be obtained with the apparatus thus far described there is herein shown a screen 37 which cooperates in producing unusual and novel effects. This screen is preferably formed with regular or irregular patterns, an example being shown in Fig. 3, producing the effect shown in Fig. 4, and another example being shown in Fig. 5; and the various area portions preferably being colored or tinted with varying colors. The pattern screen 37 is shown in the form of an endless band or drum, arranged to surround the lamp and certain mechanism, thus giving an endless moving screen which is at the same time compact and easily operated. The drum or screen 37 is shown mounted on a web or disk 38 which is keyed to a shaft 39 parallel to the shafts 21 and 33 already mentioned.

The driving connections for the pattern drum may comprise a pinion 41 on the main shaft driving a pinion 42 to which is attached a bevel pinion 43 engaging a bevel pinion 44 which in turn carries a worm 45 engaging a worm wheel 46 mounted on the screen shaft 39.

The various described gearing may be so proportioned as to give substantially the following rates of movement. Assuming a motor running at 1200 R. P. M. the gearing 30, 31 may be such as to drive the main shaft 32 at the rate of 12 R. P. M. The gearing 34, 35 may be such as to turn the lamp shaft one rotation per minute. The gearing 41—46 between the main shaft and the color screen however preferably contains a greater degree of reduction, such that the screen will make one complete rotation in twelve minutes. The complete cycle of the machine in such case will occur in a period of twelve minutes during which the screen patterns are producing constantly varying effects while the projecting filament is passing twelve times through its individual cycle of movement.

In order to minimize overheating within the housing there is shown a fan 48 attached on the motor shaft and opposite to this a concave baffle or wall 49 at the ends of which are ventilating apertures 50, so that the air within the housing is constantly renewed, being ejected through the cone reflector.

The screen may be comprised of glass, mica or other transparent material, and the pattern applied by painting or attachment of areas of transparent or translucent color or capacity. It may be removable for replacement by a substitute screen, or the effect may be altered by axially shifting the drum to a new zone, giving latitude in operation so that the effect may be changed with changes in mood of accompanying music, acting, etc. Instead of an endless drum the screen may be wound from spool to spool.

The modification shown in Fig. 6 embodies the same principles. A domestic fireplace is shown. Within this is mounted the box or housing 10$^a$ and extending downwardly below it the flaring and tapered reflectors 11ª and 12ª. The filamentary lamp 19ª within the housing thereby casts light downwardly through the double cone, the beam being received upon a preferably flat mirror 52 set at 45° so that the projection is thrown forwardly to illuminate with the effects of this invention a translucent or ground glass surface 53 occupying the fire-place opening, forming an attractive mode of exhibiting the invention.

In the form shown in Fig. 7 the housing 10ᵇ is designed as an ornamental or treasure chest. Above it are the cones 11ᵇ and 12ᵇ concealed by a cover designed as a vase 13ᵇ resting upon the chest. The lamp 19ᵇ is within the housing, and between it and the conical reflectors is a drawer or slide 55 which may carry one or more shiftable or rotary disk screens, for example such as that shown in Fig. 8, which may thus be readily replaced at will.

In any case there may be a plural number of projectors in cooperating relation; for example to the several walls of a room or sections of a dome ceiling.

The modification of Fig. 8 shows a musical instrument mechanically combined with the present invention. The housing 10ᶜ has superposed on it the flaring and tapered cones 11ᶜ and 12ᶜ concealed in a vase 13ᶜ. The lamp 19ᶜ contains the filament 20ᶜ and is mounted eccentrically on the lamp shaft 21ᶜ giving the wobbling movement as in Fig. 2. The main shaft 32ᶜ may be analogous to the shaft 32 in the other figures, driving the lamp and the pattern screen 37ᶜ which in this case is in the form of a flat disk supported upon an upright screen shaft 39ᶜ.

The remainder of the apparatus may be described beginning with the motor 60, which is connected by worm 61 and wheel 62 with the upright shaft 63 of a phonograph 64. The upright shaft through worm 65 and gear 66 drives a shaft 67 which is coupled to the main shaft 32ᶜ, by coupling 22ᶜ.

The gearing 69 between the main shaft and the lamp shaft may be analogous to the already described figures, and the gearing 71 from the main shaft to the screen shaft may be analogous, and such as to give a much slower rate of rotation to the screen than the rotation of the lamp. The electrical connection 73 may be analogous to the other figures.

One of the characteristic features hereof is the flared internal reflector between the filamentary lamp and curtain, and especially the flared reflector followed by a non-flared or tapered one. The evolving effect comprises a central nucleus or vortex, as seen in Fig. 4, of maximum brilliance, and a surrounding field of designs produced by the combination of the incandescent filament, the patterned screen when used, and the internal reflector. Rays of light pass in many ways from the lamp to the curtain, some paths being indicated in Fig. 1, these intersecting and overlapping at many points, as they weave back and forth with the oscillation of the filament. The vortex itself shifts progressively around an orbit on the curtain, returning at intervals to the same position, while the pattern changes progressively through its complete cycle at a creeping speed through a much longer interval. It is a multiple pattern in light and shadow, form and color, tending toward circular shapes, each of exquisite texture due to the interlacing paths of the rays reflecting from the internal mirrors, and further complicated by any irregularity of reflector surface. The pattern and color of the screen may change along predetermined lines, and these are introduced into the curving, weaving effect of the projected filament, affording a visual composition of great beauty, or of grotesque or entertaining character, at the heart of which is the bright area or center formed by rays received direct, without reflection, from the lamp. The complete effect is unique and of a character rendering it available as a mobile mural decoration for various purposes and places. By removing the second or converging reflector a different effect is obtainable with the diverging or flared one; with an alternating motion of expansion and contraction of the entire color design while displaying within itself exquisite progressions of pattern, texture and depth.

In the case of coordination of projection with automatic music production, the two can be coordinated and synchronized throughout the performance in appropriate relation.

To the extent that this application contains subject matter of claim in common with the disclosure of my copending application, Serial No. 735,168, filed August 30, 1924, this application is a continuation of the earlier one.

There have thus been described an art or method or light projection display and apparatus therefore embodying the principles and attaining the purposes of the present invention. Since many matters of operation, interaction, combination, arrangement and structure may be variously modified without departing from the inventive principles it is not intended to limit the invention to such matters except so far as specified in the appended claims.

What is claimed is:

1. Lensless light projection display apparatus comprising a filamentary lamp, and adjacently in front of it a truncated conical internal reflector arranged to enclose the beam of light between the lamp and curtain and deliver it without subsequent distortion to the curtain, and means for effecting progressive relative movement between the lamp and conical reflector during projection.

2. Light projection display apparatus comprising a filamentary lamp, and adjacently in front of it an internal reflector of flared-tapered form arranged to enclose the beam of light between the light source and curtain, the same being centrally open to pass the central rays direct to the curtain, and means for effecting progressive relative movement between the light source and reflector during projection.

3. Light projection display apparatus comprising a filamentary lamp, a flared internal reflector in front of the lamp, the lamp being within the angle of flare of the reflector, whereby the reflector passes central rays and deflects outer rays direct to the curtain, without distortion, and mechanism for methodically shifting the lamp during projection.

4. Apparatus as in claim 3 and wherein the filamentary lamp is shifted bodily towards and from the apex of the flare angle during projection.

5. Apparatus as in claim 3 and wherein the reflector stands upright with the lamp beneath, a housing shaped to represent the base of a table lamp surrounding the lamp, and a shade surrounding the upper part of the reflector.

6. Light projection display apparatus comprising a filamentary lamp, a base housing around it, a flared-tapered internal reflector above the lamp and housing, supplemental lamps exterior to the reflector, a shade enclosing the supplemental lamps, and mechanism for methodically shifting the lamp during projection.

7. Lensless light projection display apparatus comprising a filamentary lamp, and adjacently in front of it an internal reflector of hollow truncated double conical form arranged to enclose the light beam between the lamp and curtain and deliver it without subsequent distortion to the curtain, and means for effecting progressive relative movement between the lamp and hollow reflector during projection.

8. Light projection display apparatus comprising a filamentary lamp, a flared and tapered internal reflector in front of the lamp, arranged to deliver the beam without subsequent distortion to the curtain and centrally open to pass the center of the beam to form a projected nucleus on the curtain, and mechanism for methodically shifting the lamp during projection, relatively to the axis of the reflector, whereby to cause changing projected effects including progressive displacement of the projected nucleus.

9. Light projection display apparatus comprising a filamentary lamp, and adjacently in front of it an internal reflector of hollow truncated conical form, flared from the lamp, and in front of that a hollow truncated conical reflector tapered from the lamp, and means for effecting progressive movements of the lamp during projection, including both rotation of the lamp and bodily movement relative to the axis of the reflector.

10. Light projection display apparatus comprising a filamentary lamp, an internal reflector in front of the lamp delivering without subsequent distortion to the curtain, the lamp and reflector being relatively arranged so that the center of the beam may pass undeflected to the curtain, a movable colored pattern screen, and a common mechanism for methodically shifting the lamp during projection, relatively to the reflector, and shifting the screen relatively to both the reflector and lamp.

11. Apparatus as in claim 10 and wherein the mechanism comprises connections for advancing the color screen at a speed slower than that of the lamp.

12. Light projection display apparatus comprising a filamentary lamp, and adjacently in front of it an internal reflector of hollow form arranged to enclose the beam of light between the lamp and curtain and deliver it without subsequent distortion to the curtain, mechanism for effecting progressive relative movement between the light source and reflector during projection, an endless pattern screen mounted to travel gradually around the lamp and between it and the reflector, and drive means for effecting progressive movements of the elements during projection.

13. Apparatus as in claim 12 and wherein is a single power source for driving both the screen and lamp, with connections for moving the lamp through a plurality of cycles for a single complete cycle of the screen.

14. Light projection display apparatus comprising a filamentary lamp, and adjacently in front of it an internal reflector of flared conical form arranged to enclose the beam of light between the light source and curtain and deliver it without subsequent distortion to the curtain, mechanism for effecting progressive movement of the lamp during projection, a mechanical musical instrument, and a common actuating drive operating the mechanism and instrument in synchronism.

15. Light projection display apparatus comprising a filamentary source of light, and adjacently in front of it an internal reflector of flared-tapered form arranged to enclose the beam of light between the light source and curtain, the same being centrally open to pass the central rays direct to the curtain, and the source of light being arranged to project light to the interior surface of the reflector, and means for effective progressive relative movement between the light source and reflector during projection.

16. Light projection display apparatus comprising a filamentary lamp, a flared internal reflector in front of the lamp, arranged to deliver the beam to the curtain and centrally open to pass the center of the beam to form a projected nucleus on the curtain, and the source of light being arranged to project light to the interior surface of the reflector, and mechanism for methodically shifting the lamp during projection, relatively to the axis of the reflector, whereby to cause changing projected effects including progressive displacement of the projected nucleus.

In testimony whereof, I have affixed my signature hereto.

THOMAS WILFRED.